United States Patent
Tanaka et al.

(10) Patent No.: US 6,824,758 B2
(45) Date of Patent: Nov. 30, 2004

(54) PARTICULATE TITANIUM OXIDE AND PRODUCTION PROCESS THEREFOR

(75) Inventors: Jun Tanaka, Toyama (JP); Susumu Kayama, Toyama (JP); Hayato Yamaya, Nara (JP)

(73) Assignee: Showa Denko K.K., Tokyo (JP)

( * ) Notice: Subject to any disclaimer, the term of this patent is extended or adjusted under 35 U.S.C. 154(b) by 314 days.

(21) Appl. No.: 09/808,015

(22) Filed: Mar. 15, 2001

(65) Prior Publication Data

US 2002/0131929 A1 Sep. 19, 2002

Related U.S. Application Data

(60) Provisional application No. 60/232,852, filed on Sep. 15, 2000.

(51) Int. Cl.$^7$ ............................................. C01G 23/07
(52) U.S. Cl. ...................................... 423/613; 106/437
(58) Field of Search ................................. 423/610, 613; 106/437

(56) References Cited

U.S. PATENT DOCUMENTS

| | | | | |
|---|---|---|---|---|
| 3,923,968 A | * | 12/1975 | Basque et al. | 423/611 |
| 4,960,801 A | * | 10/1990 | Iglesia et al. | 518/715 |
| 5,201,949 A | * | 4/1993 | Allen et al. | 106/436 |
| 5,451,252 A | * | 9/1995 | Elfenthal et al. | 106/436 |
| 5,508,015 A | | 4/1996 | Gonzalez et al. | 423/613 |
| 6,001,326 A | * | 12/1999 | Kim et al. | 423/598 |
| 6,187,883 B1 | * | 2/2001 | Satoh et al. | 526/125.3 |
| 2001/0036437 A1 | * | 11/2001 | Gutsch et al. | 423/610 |

FOREIGN PATENT DOCUMENTS

| | | | | |
|---|---|---|---|---|
| JP | 3-252315 | 11/1991 | ........... | C01G/23/07 |
| JP | 6-340423 | 12/1994 | ........... | C01G/23/07 |
| JP | 9-511986 | 12/1997 | ........... | C01G/23/07 |
| JP | 10-251021 | 9/1998 | ........... | C01G/23/04 |
| LR | 1999-0044307 | 6/1999 | | |

OTHER PUBLICATIONS

Ceramics Engineering Handbook, edited by Japan Ceramics Association, Inc. p. 596–597, Gihodo Publishing Co., Ltd., no date.

* cited by examiner

*Primary Examiner*—Steven Bos
*Assistant Examiner*—Edward M. Johnson
(74) *Attorney, Agent, or Firm*—Sughrue Mion, PLLC

(57) ABSTRACT

The present invention provides particulate titanium oxide and a production process thereof. The particulate titanium oxide comprises mixed crystal titanium oxide containing rutile crystal produced by a vapor phase process, wherein the titanium oxide has a property represented by the following general formula $$R \geq 1300 \times B^{-0.95}$$

(In the formula, R represents a rutile content (%) and B represents a BET specific surface area (m$^2$/g)).

4 Claims, 2 Drawing Sheets

PARTICULATE TITANIUM OXIDE AND PRODUCTION PROCESS THEREFOR

CROSS REFERENCE TO THE RELATED APPLICATIONS

This is an application based on the prescription of 35 U.S.C. Article 111(a) with claiming the benefit of filing date of U.S. provisional application Ser. No. 60/232,852 filed on Sep. 15, 2000 under the provision of 35 U.S.C. 111(b), pursuant to 35 U.S.C. Article 119(e) (1).

BACKGROUND OF THE INVENTION

1. Field of the Invention

The present invention relates to particulates, preferably ultrafine particulates of titanium oxide suitable for ultraviolet shielding uses, photocatalytic uses and the like and a production process therefore. More specifically, the present invention relates to particulates, particularly ultrafine particulates of high rutile content titanium oxide obtained from titanium tetrachloride as a material by a vapor phase process.

2. Description of the Related Art

Particulates, particularly ultrafine particulates of titanium oxide have very wide application areas in the industrial field and their diversified uses include an ultraviolet-shielding material, an additive to silicone rubber, a photocatalyst and the like. The "titanium oxide" is referred to as "titanium dioxide" in Japanese Industrial Standard (JIS) but the term "titanium oxide" is used as a common name. Accordingly, this simple term "titanium oxide" is hereinafter used in the present invention.

The importance of titanium oxide is increasing in the use for shielding an ultraviolet ray, for example, in the field of cosmetics, clothing and the like. As a shielding material, ultrafine particulates of titanium oxide are being used in many cases because of its high safety. For the shielding, two functions of absorbing and scattering the ultraviolet rays are necessary. The ultrafine particulates of titanium oxide have both of the two functions.

Titanium oxide has three crystal forms, i.e., brookite, anatase, and rutile, latter two of which are very important for industry. And because the band gap (corresponding to excitation energy) of rutile is lower than that of anatase (i.e., the optical absorption wavelength range is on the longer wavelength side than anatase), rutile has been considered to be preferable for the ultraviolet-shielding use. However, in actual ultraviolet-shielding uses, scattering effect depending on particle diameter as well as to this absorption has to be coped with.

Recently, it has been reported that titanium oxide has a property of absorbing ultraviolet rays at a wavelength of about 400 nm or less to excite the electrons in the outermost shell, allowing the generated electrons and holes to reach the surface of particulates, where they combine with oxygen or water to generate various radical species, thereby decomposing organic materials that exist near the surface of the particle. Therefore, in the case of using titanium oxide in cosmetics and the like, generally it has been widely attempted to practice surface treatment on the surface of particulates, particularly ultrafine particulates of titanium oxide.

The fine particulates of titanium oxide are also used for making use of the photocatalytic reaction resulting from photoexcitation of titanium oxide. Furthermore, where titanium oxide is used for scattering ultraviolet rays, ultrafine particulates of titanium oxide having a primary particle size of about 80 nm are used. Generally, the primary particle diameter of ultrafine particulates has not been made clear. However, usually, those fine particulates having about 0.1 $\mu$m or less are referred to as such.

The production process for titanium oxide is roughly divided into a liquid phase process where titanium tetrachloride or titanyl sulfate is hydrolyzed in a hydrophilic solvent and a vapor phase process where a volatile material such as titanium tetrachloride is vaporized and then the resulting vapor is reacted with an oxidizing gas such as oxygen and steam. In the vapor phase process, ultrafine particulate titanium oxide is obtained. However, only such titanium oxide as one composed of anatase as a main phase has been obtained. Therefore, conventionally, ultrafine particulate titanium oxide of a rutile structure has been obtained by a liquid phase process.

In general, the powder of titanium oxide produced by the liquid phase process disadvantageously undergoes heavy aggregation. For this reason, when titanium oxide is used in cosmetics and the like, the titanium oxide must be strongly cracked or pulverized, so that there arise problems such as mingling of abraded materials attributable to the pulverization treatment or the like, non-uniform distribution of the particle size, or bad touch feeling.

Several production processes for titanium oxide having high rutile contents have heretofore been proposed. For example, Japanese Patent Application Laid-Open No. 3-252315 discloses a production process where the ratio of hydrogen in the mixed gas comprising oxygen and hydrogen in the vapor phase reaction is changed to adjust the ratio of rutile content and a process for producing high purity titanium oxide having a rutile content of 99% or more by adjusting the concentration of hydrogen to from 15 to 17% by volume. Also, Japanese Patent Application Laid-Open No. 6-340423 discloses production process for titanium oxide having high rutile content (the rutile content being from 85% by weight to 90% by weight) where the production is performed by setting the molar ratio of titanium tetrachloride, hydrogen and oxygen in the mixed gas to specified mixing ratios.

In the case of titanium oxide produced by the vapor phase process, the same problems as in the production by the liquid phase process will arise. That is, although particulates, particularly ultrafine particulates of titanium oxide may be obtained by the conventional vapor phase process, only particulates of titanium oxide which have undergone grain growth can be obtained. Thus, for obtaining ultrafine particulates of titanium oxide, the titanium oxide must be strongly cracked or pulverized. Moreover, titanium oxide having high rutile content is ultrafine particulate, though ultrafine particulate, does not have sufficient specific surface area and it is insufficient in dispersibility, which is desired in various uses to start with cosmetics.

SUMMARY OF THE INVENTION

The present invention has been made to solve the above-described problems and an object of the present invention is to provide particulates, particularly ultrafine particulates of titanium oxide having a high rutile content which undergo considerably reduced aggregation and are highly dispersible.

Another object of the present invention is to provide a production process for producing such particulates, particularly ultrafine particulates of titanium oxide having a high rutile-content.

The present inventors have made extensive investigations with view to solving the above-described problems. As a result, they have found that particulate, particularly ultrafine particulate titanium oxide with a high rutile content having specified properties, which is titanium oxide having a high rutile content and a high BET specific surface area can be obtained by a vapor phase process comprising preheating a diluted titanium tetrachloride gas and an oxidizing gas, respectively, supplying them at specified flow rates into a reaction tube, and allowing them to react with each other for a specified time of residence at high temperatures. Thus, the present invention has been accomplished.

That is, the present invention relates to the followings:

[1] Particulate titanium oxide comprising a mixed crystal titanium oxide containing rutile crystal produced by a vapor phase process, wherein the titanium oxide has a property represented by the following general formula (1)

$$R \geq 1,300 \times B^{-0.95} \quad (1)$$

wherein R represents a rutile content (%) measured by an X-ray diffraction method and B represents a BET specific surface area ($m^2/g$), which ranges from about 15 to about 200 $m^2/g$.

[2] The particulate titanium oxide as described in 1 above, wherein the BET specific surface area represented by B is about 40 to about 200 $m^2/g$.

[3] The particulate titanium oxide as described in 1 above, wherein the titanium oxide has a 90% cumulative weight particle size distribution diameter D90 measured by a laser diffraction-type particle size distribution measuring method of about 2.5 $\mu$m or less.

[4] The particulate titanium oxide as described in 1 above, wherein the titanium oxide has a distribution constant n according to Rosin-Rammler formula is about 1.5 or more.

[5] A production process for producing particulate titanium oxide, comprising subjecting a titanium tetrachloride diluted gas obtained by diluting titanium tetrachloride to from about 10% by volume or more to about 90% by volume or less with an inert gas to high temperature oxidation with an oxidizing gas containing oxygen or steam, or both, wherein the titanium tetrachloride diluted gas and the oxidizing gas, each preheated to about 900° C. or more, are supplied into reaction tube at a flow rate of about 20 m/sec or more and allowed to react for a time of residence at high temperatures above about 700° C. of about 3 seconds or less.

[6] The production process as described in 5 above, wherein use is made of a titanium tetrachloride diluted gas obtained by diluting titanium tetrachloride to about 20% by volume or more and about 80% by volume or less with an inert gas.

[7] The production process as described in 5 above, wherein the temperatures for preheating the titanium tetrachloride and the oxidizing gas are each about 1,000° C. or more.

[8] The production process as described in 5 above, wherein the titanium tetrachloride diluted gas and oxidizing gas are supplied to the reaction tube through a coaxial parallel flow nozzle having an inner tube, the inner tube having an inner diameter of about 50 mm or less.

[9] Particulate titanium oxide produced by the production method as described in 5 above.

[10] A titanium oxide composition comprising particulate titanium oxide as described in 1 above.

[11] A titanium oxide composition comprising particulate titanium oxide as described in 9 above.

DETAILED DESCRIPTION OF THE INVENTION

According to the present invention, in respect of the mixed crystal titanium oxide containing rutile crystal (abbreviated as rutile-containing titanium oxide) obtained by a vapor phase process using titanium tetrachloride as a material, the rutile-containing titanium oxide has a property represented by the following general formula (1):

$$R \geq 1,300 \times B^{-0.95} \quad (1)$$

Figure 1:
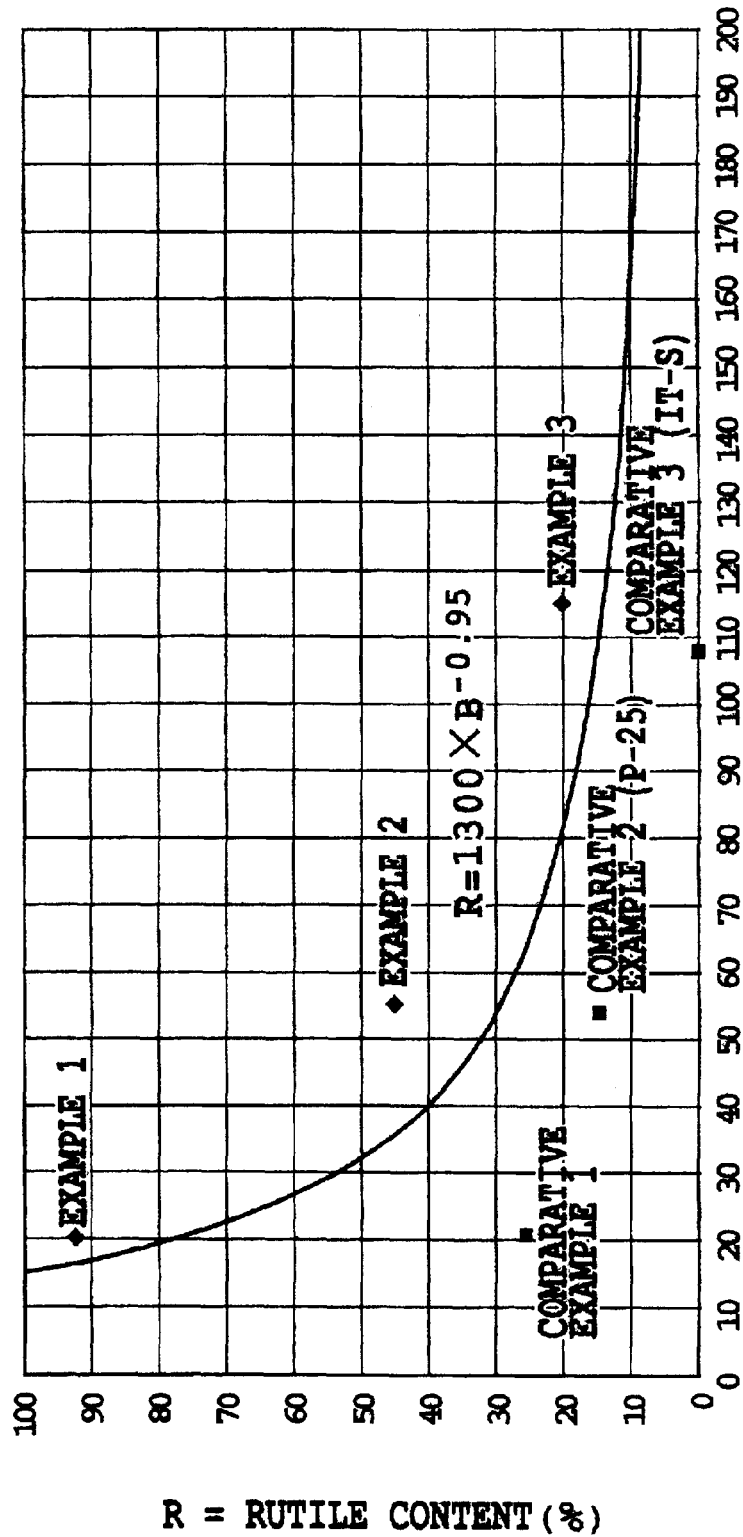
FIG. 1 is a diagram showing the range of property of the ultrafine particulate, rutile-containing titanium oxide of the present invention in respect of rutile content vs. BET specific surface area of the ultrafine particulate titanium oxide.

(In the formula, R represents a rutile content (%) measured by an X-ray diffraction method and B represents a BET specific surface area ($m^2/g$), which ranges from about 15 to about 200 $m^2/g$). That is, the particulate, particularly ultrafine particulate rutile-containing titanium oxide is rutile-containing titanium oxide that satisfies the condition of the above general formula (1) in FIG. 1. The known particulate, particularly ultrafine particulate titanium oxides, though they are rutile-containing titanium oxides, have properties plotted in the region below the curve $R=1,300 \times B^{-0.95}$ in the relationship between the rutile content (%) and BET specific surface area.

The rutile-containing titanium oxide of the present invention satisfies the property of the general formula (1) and is particulate, particularly ultrafine particulate and has as its feature a BET specific surface area in the range of from about 15 to about 200 $m^2/g$, preferably from about 40 to about 200 $m^2/g$.

Furthermore, the particulate rutile-containing titanium oxide of the present invention preferably has a small particle diameter and a sharp particle size distribution. In the present invention, a laser diffraction-type particle size distribution measuring method is adopted as an index of dispersibility and particle size distributions were measured. The procedures for measuring particle size distributions will be described below.

A slurry obtained by adding 50 ml of pure water and 100 $\mu$l of a 10% aqueous sodium hexametaphosphate solution to 0.05 g of titanium oxide is irradiated with an ultrasonic wave (46 KHz, 65 W) for 3 minutes. Then, this slurry is measured of its particle size by a laser diffraction-type particle size analyzer (SALD-2000J, manufactured by Shimadzu Corporation). It can be said that when the thus-measured D90 diameter (i.e., a size corresponding to 90% of the particle size cumulative distribution on a weight basis) is small, good dispersibility in a hydrophilic solvent is attained.

The particulates of titanium oxide of the present invention have excellent uniformity in particle size distribution. In the present invention, the uniformity in particle size distribution is specified by a distribution constant (n) obtained using the Rosin-Rammler formula. The Rosin-Rammler formula is briefly described below. Details thereof are described in *Ceramic Kogaku Handbook* (*Ceramic Engineering Handbook*), compiled by Nippon Ceramics Kyokai, 1st ed., pages 596 to 598 (1989).

The Rosin-Rammler formula is represented by the following formula (2):

$$R = 100 \exp(-bD^n) \quad (2)$$

wherein D is a particle size, R is a percentage of the number of particles larger than D to the total number of particles, and n is a distribution constant.

Assuming that $b=1/De^n$, the formula (2) is rewritten as follows:

$$R=100 \exp\{-(D/De)^n\} \quad (3)$$

wherein De is an absolute size constant and n is a distribution constant. The constant b in the formula (2) is a constant derived from an absolute size constant, De, i.e., the particle diameter corresponding to an ober particle diameter (also called "plus sieve" or "oversize") of 36.8% (R=1/e=0.368), and a distribution constant, n, according to the above formula: $b=1/De^n$.

From formulae (2) and (3), the following formula (4) is obtained:

$$\log\{\log(100/R)\}=n \log D+C \quad (4)$$

wherein C is a constant. From the formula (4), the relationship between log D and log{log(100/R)} is plotted on the Rosin-Rammler (RR) chart where log D is graduated on the x axis and log{log(100/R)} is graduated on the y axis. Then, a nearly straight line is obtained. The gradient (n) of this straight line indicates the degree of uniformity of the particle size. It can be said that when the numerical value of n becomes larger, the uniformity of particle size distribution becomes more excellent.

The particulates of titanium oxide of the present invention preferably have a size corresponding to 90% of the particle size cumulative distribution on a weight basis as termed D90 diameter, of about 2.5 $\mu$m or less and a distribution constant n by the Rosin-Rammler formula of about 1.5 or more.

The particulates of titanium oxide of the present invention may be contained as a pigment or a particle component using the photocatalytic effect in various compositions. More specifically, the ultrafine particulates of titanium oxide of the present invention may be used in various products such as cosmetics, clothes, ultraviolet ray-shielding materials and an additive of silicone rubber.

Figure 2:
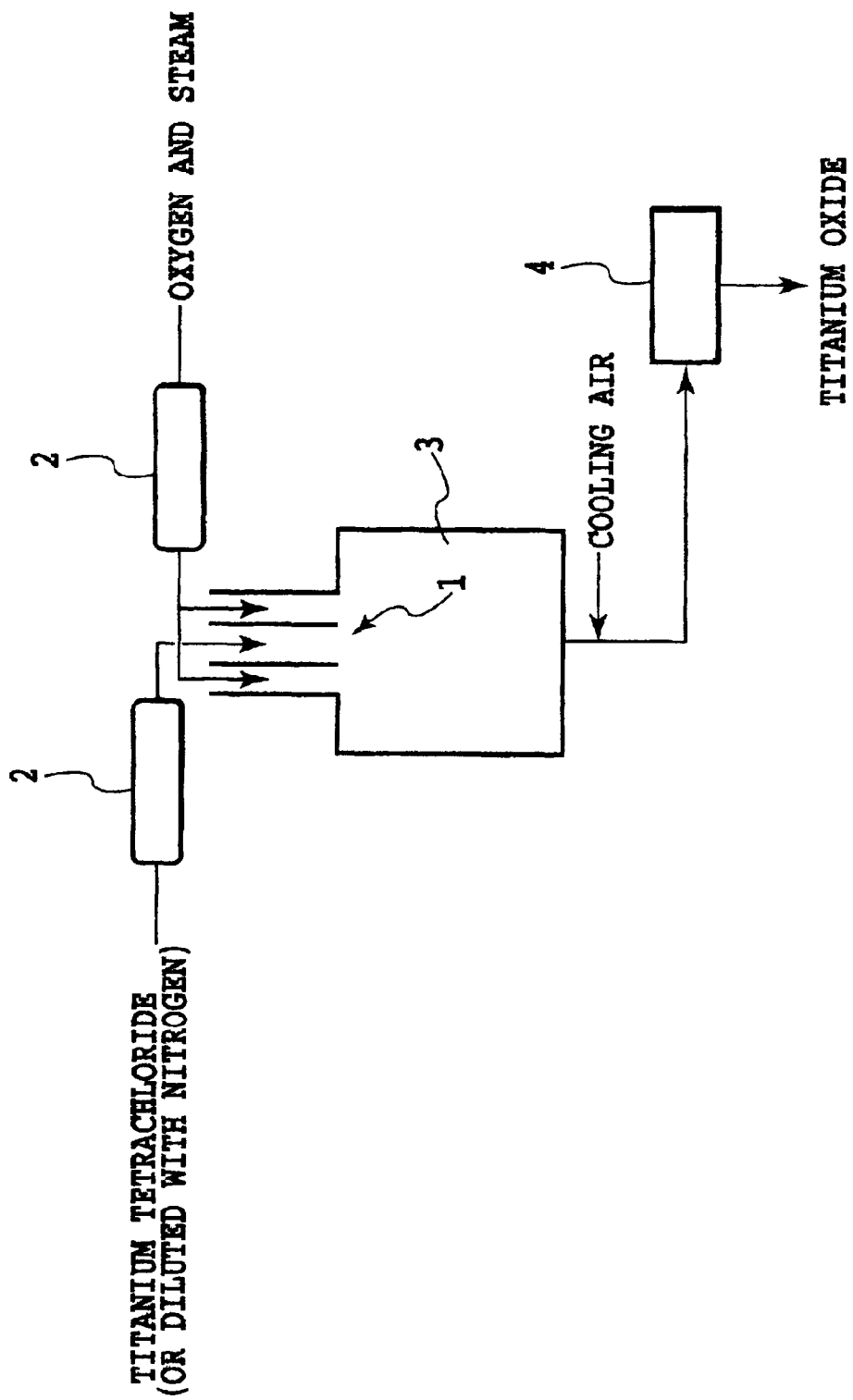
FIG. 2 is a schematic diagram showing a reaction tube having a coaxial parallel flow nozzle used in the production process for producing particulate titanium oxide of the present invention by a vapor phase process.

Next, referring to the attached drawings, the production process for producing particulate titanium oxide of the present invention will be described below. FIG. 2 is a schematic diagram showing a reaction tube having a coaxial parallel flow nozzle used in the production process for producing particulate titanium oxide of the present invention by a vapor phase process. A gas containing titanium tetrachloride is preheated in a preheater 2 to a predetermined temperature and introduced into a reaction tube 3 through an inner tube of a coaxial parallel flow nozzle portion 1. An oxidizing gas is preheated in a preheater 2 and introduced into the reaction tube 3 through an outer tube of the coaxial parallel nozzle portion 1. In the present invention, the temperatures of respective preheaters 2, 2 may be different from each other. The gases introduced into the reaction tube are mixed, allowed to react, cooled with a cooling gas, and then fed to a bag filter where the resulting particulates of titanium oxide are collected.

A general production process of titanium oxide by a vapor phase process is known, where titanium tetrachloride is oxidized using an oxidizing gas such as oxygen or steam under the reaction condition of about 1,000° C. to thereby obtain particulates of titanium oxide.

The growth mechanism of particulate in the vapor phase process is roughly classified into two types. One is CVD (chemical vapor deposition) and another is the growth by collision (coalescence) and sintering of particles. In either case, the growth time (growth zone) must be short so as to obtain particulates, particularly ultrafine particulates of titanium oxide as aimed at by the present invention. More specifically, in the former growth, the growth may be prevented by elevating the preheating temperature to thereby increase the chemical reactivity (reaction rate). In the latter growth, cooling, dilution or the like is swiftly applied to the particulates after the completion of CVD to thereby reduce the time of residence at high temperatures as much as possible, so that the growth by sintering and the like can be prevented.

On the other hand, when it is attempted to obtain particulates with high rutile contents, time of residence at high temperatures must be sufficiently long in order to promote thermal conversion of anatase to rutile. This is inconsistent with the above-described production conditions for particulates, particularly ultrafine particulates. Therefore, conventionally, particulates, particularly ultrafine particulates obtained by a vapor phase process are composed mainly of anatase or amorphous.

As described above, the present invention relates to a vapor phase process for producing titanium oxide by oxidizing a diluted titanium tetrachloride gas, which has been diluted with an inert gas to about 90% or less of titanium chloride, with an oxidizing gas at a high temperature, and includes supplying the diluted titanium tetrachloride gas and the oxidizing gas each preheated to about 900° C. or more into a reaction tube each at a flow rate of about 20 m/sec or more and allowing them to react at an average residence time of about 3 seconds or less to obtain particulate, particularly ultrafine particulate titanium oxide having a high rutile content in the relationship of BET specific surface area vs. rutile content.

Further, in the present invention, the concentration of titanium tetrachloride in the diluted titanium tetrachloride gas preferably is from about 10 to about 90% by volume, more preferably from about 20 to about 80% by volume. If the concentration of titanium tetrachloride is about 10% by volume or less, the reactivity is low and the rutile content is not increased. On the other hand, if the concentration of titanium tetrachloride is about 90% by volume or more, the collision/sintering of particles is promoted so that desired particulate, particularly ultrafine particulate titanium oxide cannot be obtained.

The gas for diluting the titanium tetrachloride must be selected from those that do not react with titanium tetrachloride and are not oxidized thereby. Specific examples thereof include nitrogen and argon.

The preheating temperatures for the diluted titanium tetrachloride gas and oxidizing gas, which temperatures may be the same or different, are each preferably about 900° C. or more, more preferably about 1,000° C. or more and most preferably 1,100° C. or more. If the preheating temperature is lower than about 900° C., the reactivity near the nozzle is low so that the rutile content is not increased.

The diluted titanium tetrachloride gas and the oxidizing gas are introduced into a reaction tube each at a flow rate of preferably about 20 m/sec or more, more preferably about 30 m/sec or more and most preferably about 50 m/sec or more. By increasing the flow rates, mixing of the two gases is accelerated. If the introduction temperature is about 900° C. or more, the reaction is completed at the same time with the mixing, so that the generation of uniform seed particles can be increased and the reaction zone (zone where CVD-governed, grown particles are formed) can be made smaller. If the flow rate is less than about 20 m/sec, the mixing occurs insufficiently, thus failing to give particulates, particularly ultrafine particulates. As the inlet nozzle, those nozzles are adopted that give a coaxial parallel flow, an oblique flow or a cross flow.

It is preferred that the preheated titanium tetrachloride-containing gas and the preheated oxidizing gas be supplied into the reaction tube to generate turbulence in the reaction tube. Also, it is preferred that the titanium tetrachloride-containing gas and the oxidizing gas be supplied into the reaction tube through a coaxial parallel flow nozzle and that the inner diameter of the inner tube of the coaxial parallel flow nozzle be about 50 mm or less.

On the other hand, when the material gases are introduced into the reaction tube and the reaction is allowed to proceed, there exists a reaction zone (region) where the reaction temperature exceeds about 1,000° C. since the reaction is an exothermic reaction. Although the heat is more or less released from the reactor, the particulates of titanium oxide will grow fast unless rapid cooling is practiced. Accordingly, in the present invention, it is preferred to set the time of residence at high temperatures above about 700° C. to about 3 seconds or less, preferably about 1 second or less and more preferably about 0.5 second or less and then performing rapid cooling. The time of residence at high temperatures exceeding about 3 seconds is not preferable since sintering of the particles will proceed.

As means for rapid cooling the titanium oxide particulates after the reaction, a method of introducing a large amount of gas such as cooled air or nitrogen or a method of spraying water may be adopted.

The particulate, particularly ultrafine particulate titanium oxide of the present invention has a sharp particle size distribution and is excellent in dispersibility in aqueous solvents so that it advantageously finds application in shielding ultraviolet rays in the field of cosmetics, clothes and the like. Therefore, the particulate titanium oxide of the present invention may be mixed with conventional carriers, additives and the like that are known in these fields to give rise compositions for use in shielding ultraviolet rays.

EXAMPLES

Hereinafter, the present invention will be described concretely by examples. However, the present invention should not be construed as being limited thereto.

Example 1

A diluted titanium tetrachloride gas obtained by diluting 11.8 Nm$^3$/hr (N means normal state, hereinafter the same) of gaseous titanium tetrachloride with 4 Nm$^3$/hr of nitrogen gas was preheated to 1,100° C. An oxidizing gas obtained by mixing 8 Nm$^3$/hr of oxygen and 20 Nm$^3$/hr of steam was preheated to 1,000° C. These material gases were introduced using the reaction apparatus shown in FIG. 2 into a silica glass reactor through a coaxial parallel flow nozzle at flow rates of 40 m/sec and 30 m/sec, respectively. After introducing cooling air into the reaction tube so that the time of residence at high temperatures above 700° C. could be 0.3 second, the ultrafine particulates of titanium oxide were collected using a Teflon-made bag filter.

The obtained particulates of titanium oxide had a BET specific surface area of 20 m$^2$/g and a ratio of rutile contained (also called rutile content) of 92%. The BET specific surface area was measured by a specific surface area measuring device (machine type was Flow SorbII, 2300) produced by Shimadzu Corporation contained was a ratio (=100×Sr/(Sr+Sa)) calculated from a peak area corresponding to rutile type crystal (abbreviated as Sr) and a peak area corresponding to anatase type crystal (abbreviated as Sa) in X-ray diffraction. The above-described rutile content was a value by far greater than the value calculated by introducing the value of specific area of 20 m$^2$/g into the general formula (1).

On the particle size distribution of the powder of titanium oxide obtained here, a 90% cumulative weight particle size distribution diameter D90 was measured by a laser diffraction-type particle size distribution measuring method. As a result, the 90% cumulative weight particle size distribution diameter D90 was 1.2 μm and the n value according to the Rosin-Rammler formula was 2.3.

The n value was obtained by plotting three-point data D10, D50 and D90 obtained in the laser diffraction on the RR chart as R=90%, 50% and 10%, respectively, and determined from an approximate straight line drawn on these 3 points.

Example 2

A diluted titanium tetrachloride gas obtained by diluting 8.3 Nm$^3$/hr of gaseous titanium tetrachloride with 6 Nm$^3$/hr of nitrogen gas was preheated to 1,100° C. An oxidizing gas obtained by mixing 4 Nm$^3$/hr of oxygen and 15 Nm$^3$/hr of steam was preheated to 1,100° C. These material gases were introduced into a silica glass reactor using the reaction apparatus shown in FIG. 2 through a coaxial parallel flow nozzle at flow rates of 35 m/sec and 50 m/sec, respectively. After introducing cooling air into the reaction tube so that the time of residence at high temperatures above 700° C. could be 0.2 second, the resulting particulates of titanium oxide were collected using a Teflon-made bag filter.

The obtained particulate titanium oxide had a BET specific surface area of 55 m$^2$/g and a rutile content of 45%. The rutile content was a value by far greater than the value calculated by substituting the general formula (1) with a specific area of 55 m$^2$/g. The powder had a 90% cumulative weight particle size distribution diameter D90 of 1.4 μm according to the particle size distribution measured by a laser diffraction type particle size distribution measuring method. The n value in Rosin-Rammler formula was 2.0.

Example 3

A diluted titanium tetrachloride gas obtained by diluting 4.7 Nm$^3$/hr of gaseous titanium tetrachloride with 16 Nm$^3$/hr of nitrogen gas was preheated to 1,100° C. An oxidizing gas obtained by mixing 20 Nm$^3$/hr of air and 25 Nm$^3$/hr of steam was preheated to 1,000° C. These material gases were introduced into a silica glass reactor using the reaction apparatus shown in FIG. 2 through a coaxial parallel flow nozzle at flow rates of 45 m/sec and 60 m/sec, respectively. After introducing cooling air into the reaction tube so that the time of residence at high temperatures above 700° C. could be 0.2 second, the ultrafine particulates of titanium oxide were collected using a Teflon-made bag filter.

The obtained titanium oxide had a BET specific surface area of 115 m$^2$/g and a rutile content of 20%. The rutile content was a value by far greater than the value calculated by introducing the value of the specific surface area of 115 m$^2$/g into the general formula (1). The powder had a 90% cumulative weight particle size distribution diameter D90 of 2.1 μm according to the particle size distribution measured by a laser diffraction type particle size distribution measuring method. The n value in Rosin-Rammler formula was 1.8.

Comparative Example 1

A diluted titanium tetrachloride gas obtained by diluting 8.3 Nm$^3$/hr of gaseous titanium tetrachloride with 6 Nm$^3$/hr of nitrogen gas was preheated to 800° C. An oxidizing gas obtained by mixing 4 Nm³/hr of oxygen and 15 Nm³/hr of steam was preheated to 900° C. These material gases were introduced into a silica glass reactor using the reaction apparatus shown in FIG. 2 through a coaxial parallel flow nozzle at flow rates of 35 m/sec and 50 m/sec, respectively. After introducing cooling air into the reaction tube so that the time of residence at high temperatures above 700° C. could be 0.3 second, the particulates of titanium oxide were collected using a Teflon-made bag filter.

The obtained particulates of titanium oxide had a BET specific surface area of 21 m²/g and a rutile content of 26%. The rutile content was a value by far smaller than the value calculated by introducing the value of the specific surface area of 21 m²/g into the general formula (1). The powder had a 90% cumulative weight particle size distribution diameter D90 of 2.9 μm according to the particle size distribution measured by a laser diffraction-type particle size distribution measuring method. The n value in Rosin-Rammler formula was 1.8.

Comparative Example 2

Analysis of ultrafine particulate titanium oxide P-25, produced by Nippon Aerosil Co., Ltd. revealed that it had a specific surface area of 54 m²/g and a rutile content of 15%. The rutile content was a value smaller than the value calculated by incorporating the value of the specific surface area of 54 m²/g into the general formula (1). The powder had a 90% cumulative weight particle size distribution diameter D90 of 3.1 μm according to the particle size distribution measured by a laser diffraction type particle size distribution measuring method. The n value in Rosin-Rammler formula was 1.4.

Analysis of ultrafine particulate titanium oxide IT-S, produced by Idemitsu Kosan Co., Ltd. revealed that it had a specific surface area of 108 m²/g and a rutile content of 0% (amorphous). The value that was calculated by introducing the value of the specific surface area of 108 m²/g into the general formula (1) was 16%. The particle size distribution of the powder was measured by a laser diffraction-type particle size distribution measuring method and its 90% cumulative weight particle size distribution diameter D90 revealed to be 6.3 μm. The n value in Rosin-Rammler formula was 1.8.

INDUSTRIAL APPLICABILITY

The particulate, particularly ultrafine particulate titanium oxide satisfies the condition of the above-described general formula (1) in the correlation of BET specific surface area (B) vs. rutile content (R). Also, the particulate rutile-containing titanium oxide obtained by the production method of the present invention has a rutile content much higher than other titanium oxide having equivalent BET specific surface area and is particularly excellent in dispersibility.

Further, the ultrafine particulate titanium oxide having such a property is preferably one having a 90% cumulative weight particle distribution particle D90 measured by a laser diffraction-type particle size measuring method of 2.5 μm or less and more preferably one having a distribution constant n according to the Rosin-Rammler formula of 1.5 or more.

The titanium oxide having the property according to the present invention is suitable for ultraviolet-shielding use in the field of cosmetics and clothing and the like. In particular, it has a sharp particle size distribution and is excellent in dispersibility in aqueous solvents so that cracking process or the like is unnecessary or may require only a very small-scale installation. Thus, it has a very great practical value in industry.

The invention may be embodied in other specific forms without departing from the spirit or essential characteristics thereof. Therefore, the present embodiment is to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A production process for producing particulate titnium oxide, comprising subjecting a titanium tetrachloride diluted gas obtained by diluting titanium tetrachloride to from about 10% by volume or more to about 90% by volume or less with an inert gas to high temperature oxidation with an oxidizing gas containing oxygen or steam, or both, wherein the titanium tetrachloride diluted gas and the oxidizing gas, each preheated to about 900° C. or more, are supplied into reaction tube at a flow rate of about 20 m/sec or more and allowed to react for a time of residence at high temperatures above about 700° C. of about 3 seconds or less.

2. The production process as claimed in claim 1, wherein use is made of a titanium tetrachloride diluted gas obtained by diluting titanium tetrachloride to about 20% by volume or more and about 80% by volume or less with an inert gas.

3. The production process as claimed in claim 1, wherein the temperatures for preheating the titanium tetrachloride and the oxidizing gas are each about 1000° C. or more.

4. The production process as claimed in claim 1, wherein the titanium tetrachloride diluted gas and oxidizing gas are supplied to the reaction tube through a coaxial parallel flow nozzle having an inner tube, the inner tube having an inner diameter of about 50 mm or less.

* * * * *